US009809162B2

(12) United States Patent
Czylok

(10) Patent No.: US 9,809,162 B2
(45) Date of Patent: Nov. 7, 2017

(54) VEHICLE INTERIOR SPOTLIGHT

(71) Applicant: TRUCK-LITE EUROPE GMBH, Eisenach (DE)

(72) Inventor: Sebastian Czylok, Eisenach (DE)

(73) Assignee: Truck-Lite Europe GmbH, Eisenach (DE)

(*) Notice: Subject to any disclaimer, the term of this patent is extended or adjusted under 35 U.S.C. 154(b) by 0 days.

(21) Appl. No.: 14/763,207

(22) PCT Filed: Oct. 16, 2013

(86) PCT No.: PCT/EP2013/071642
§ 371 (c)(1),
(2) Date: Jul. 24, 2015

(87) PCT Pub. No.: WO2014/117877
PCT Pub. Date: Aug. 7, 2014

(65) Prior Publication Data
US 2015/0360607 A1 Dec. 17, 2015

(30) Foreign Application Priority Data

Feb. 4, 2013 (DE) .................... 20 2013 001 056 U
Mar. 10, 2013 (DE) .................... 20 2013 101 038 U

(51) Int. Cl.
*F21V 5/00* (2015.01)
*B60Q 3/44* (2017.01)
(Continued)

(52) U.S. Cl.
CPC .............. *B60Q 3/44* (2017.02); *B60Q 3/51* (2017.02); *B60Q 3/76* (2017.02); *F21S 48/215* (2013.01); *F21S 48/22* (2013.01)

(58) Field of Classification Search
CPC .......... B60Q 3/0286; B60Q 3/44; B60Q 3/51; F21V 5/08; F21V 5/008; F21V 5/048
See application file for complete search history.

(56) References Cited

U.S. PATENT DOCUMENTS 6,249,375 B1 * 6/2001 Silhengst .............. B61L 5/1836
116/63 R
6,283,621 B1 * 9/2001 Macri .................. B60Q 3/0279
362/245

(Continued)

FOREIGN PATENT DOCUMENTS

WO  2011/082998 A1  7/2011

OTHER PUBLICATIONS

International Search Report of PCT/EP2013/071642, dated Feb. 24, 2014. [PCT/ISA/210].

*Primary Examiner* — Robert May
(74) *Attorney, Agent, or Firm* — Sughrue Mion, PLLC

(57) ABSTRACT

The invention relates to a vehicle interior light (3) for spot-illuminating a surface (10, 10') inside the vehicle to be illuminated, comprising a light source, the main emitting direction of which does not coincide with the direction in which the surface to be illuminated lies, and a deflecting lens system, which alters both the opening angle and the direction of the central axis of the cone of light emitted by the light source. The deflecting lens system is formed by at least two lens bodies (14, 15, 16) arranged in succession in the beam path of the light source and working by means of light refraction, the central axes (18, 19, 20) and optically active lens surfaces of which lens bodies are inclined with respect to one another.

7 Claims, 2 Drawing Sheets

Figure 1:
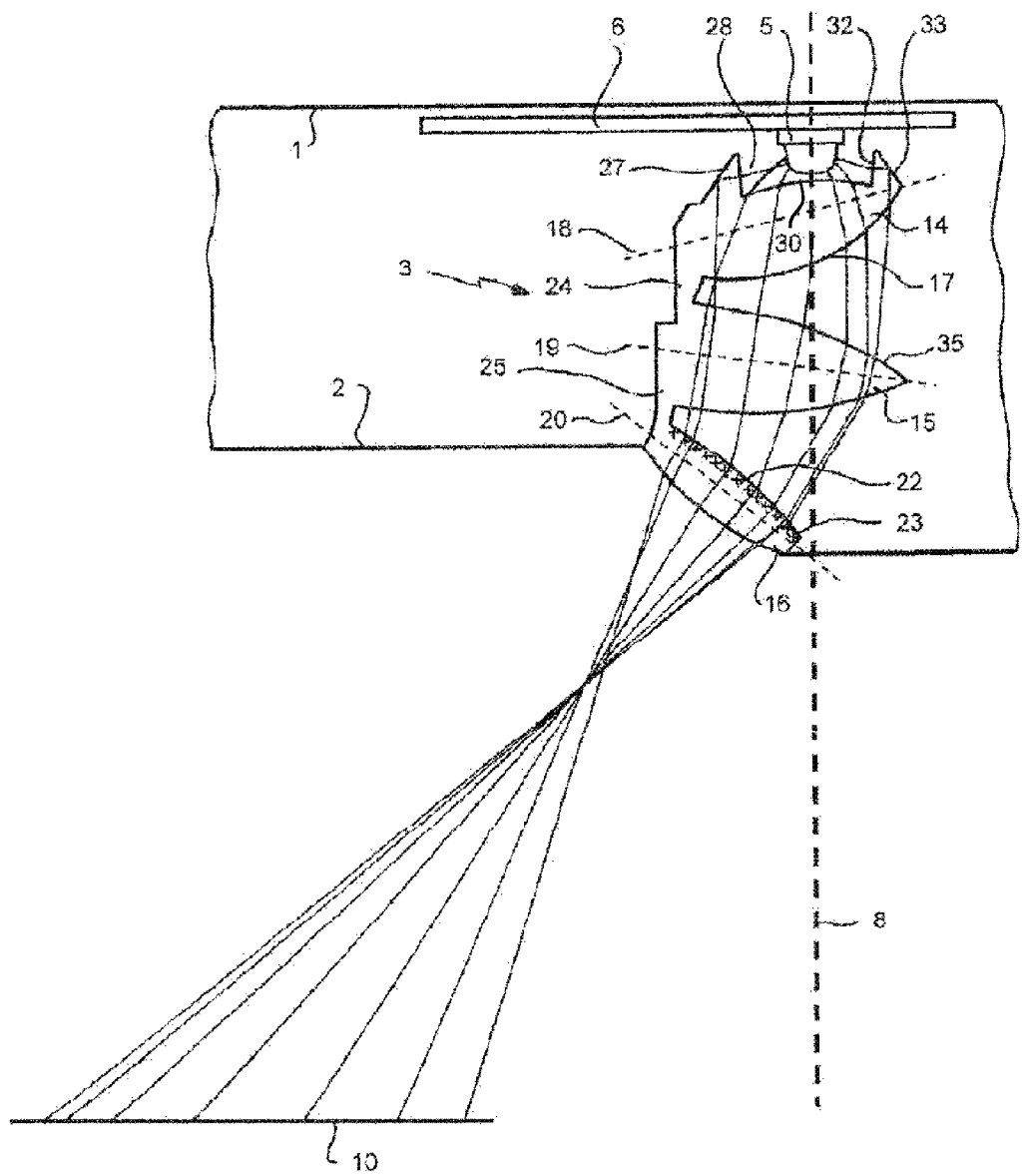

(51) Int. Cl.
*F21S 8/10* (2006.01)
*B60Q 3/51* (2017.01)
*B60Q 3/76* (2017.01)

(56) References Cited

U.S. PATENT DOCUMENTS

| | | |
|---|---|---|
| 7,150,548 B2* | 12/2006 | Kohlmeier-Beckmann ................. B60Q 3/0253 362/471 |
| 9,171,488 B2* | 10/2015 | Beier ........................ G09F 9/33 |
| 2006/0256563 A1* | 11/2006 | Uke ........................ F21L 4/027 362/335 |
| 2007/0236926 A1 | 10/2007 | Guard et al. |
| 2007/0263400 A1 | 11/2007 | Walser et al. |
| 2012/0081901 A1* | 4/2012 | Tsang ........................ F21V 9/16 362/277 |
| 2012/0230530 A1 | 9/2012 | Schevardo |
| 2012/0292986 A1 | 11/2012 | Riedel et al. |

\* cited by examiner

VEHICLE INTERIOR SPOTLIGHT

CROSS REFERENCE TO RELATED APPLICATIONS

This application is a National Stage of International Application No. PCT/EP2013/071642 filed Oct. 16, 2013, claiming priority based on German Patent Application Nos. 20 2013 001 056.8, filed Feb. 4, 2013 and 20 2013 101 038.3, filed Mar. 10, 2013, the contents of all of which are incorporated herein by reference in their entirety.

The invention concerns a vehicle interior light of the kind set forth in the classifying portion of claim 1.

Spotlights of that kind are frequently installed in the interior of a vehicle, in particular a motor vehicle, at a location which does not make it readily possible for the light cone emitted by the light source to be propagated with a central axis extending in a straight line because in that situation it could be directed on to the desired surface to be illuminated only if the light source were mounted in the light on an especially tilted carrier board. That applies in particular when the light source used is only a single LED which emits its light in a spatial cone with a very large angle of aperture.

To avoid the structural complication and expenditure involved in a tilted arrangement of the carrier board and to avoid generally also an increased space requirement, it is known from the state of the art to arrange in front of the light source a deflecting optical system which not only focuses the emitted light beam, that is to say reduces its angle of aperture, but also alters its main propagation direction in the desired fashion.

It is known from the state of the art to use a deflecting optical system in the form of a light guide body into which the light of the light source is introduced as completely as possible and whose outside surfaces are so shaped that they pass that light by total reflection to a light exit surface of the light guide body, through which it issues in the desired direction with the desired focusing effect.

A disadvantage with that known solution is that, to achieve a high light yield, very high demands must be made on the surface quality of the total-reflection surfaces, thereby giving rise to comparatively high manufacturing costs, and only a few independent surfaces are available for determining the projection imaging effect.

In comparison the object of the invention is to provide a vehicle interior light of the kind set forth in the opening part of this specification, which uses a substantially less expensive deflecting optical system which at the same time ensure a high level of light efficiency.

To attain that object, the invention provides the features set forth in claim 1.

According to the invention provided as the deflecting optical system is a lens system which includes two or more lens bodies and in which the central axes or optically active lens surfaces of the individual lens bodies are so inclined relative to each other that the desired change in the main propagation direction of the light cone emitted by the light source is achieved, with at the same time a reduction in its angle of aperture, substantially by light refraction and not by total reflection.

By a suitable choice of the angles through which the central axes of the lens bodies are inclined relative to each other it is possible to structurally alter the extent of the change in direction for various types of vehicle interior lights according to the invention, within wide limits.

To avoid a high degree of adjustment complication and involvement when mounting the vehicle interior lights according to the invention it is preferably provided that the individual lens bodies are connected together in one piece with each other at their optically non-active sides by material bridges. In that way the angles of the change in direction which are different in different types of the vehicle interior light according to the invention can be established by the injection molding mold respectively used for manufacture of the lens system so that it is possible to dispense with individual orientation of the individual lens bodies when mounting the vehicle interior light according to the invention.

These and other advantageous configurations of a vehicle interior light according to the invention are set forth in the appendant claims.

Figure 2:
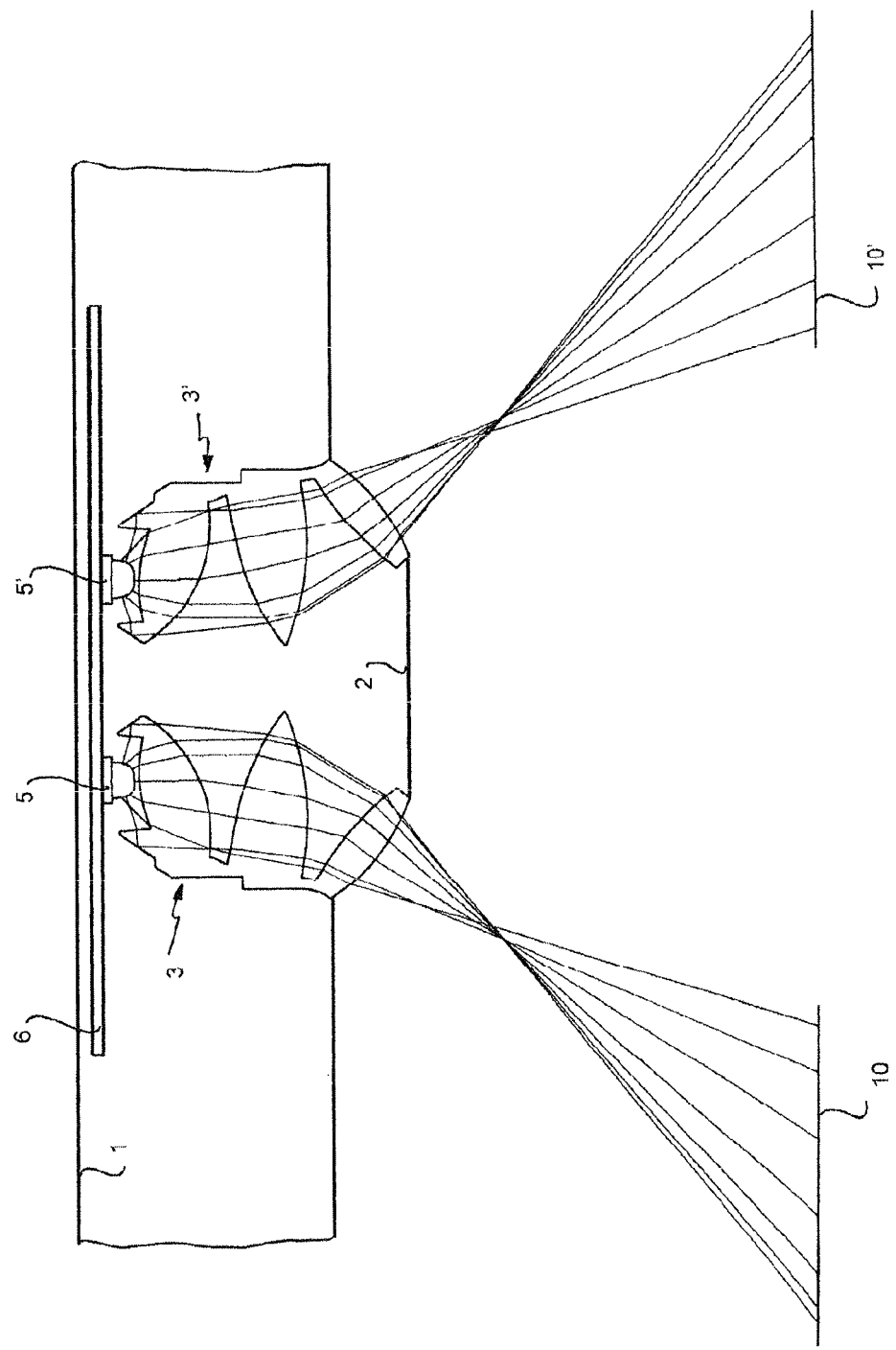

The invention is described hereinafter by means of embodiments by way of example with reference to the drawing in which:

FIG. 1 shows a highly diagrammatic view of the essential parts of a vehicle interior light according to the invention, and FIG. 2 is a view substantially corresponding to FIG. 1 illustrating the installation situation of two vehicle interior lights according to the invention as reading lights in a vehicle.

In the Figures identical parts are denoted by mutually corresponding references. To clearly show important details the Figures are not true to scale; in particular the spacings of the respective light exit openings from the associated surface to be illuminated are shown as being considerably reduced.

Parts which are naturally present in practice like for example mounting holders, covers, face plates, switches for actuation of the light function and so forth, as are generally usual in relation to vehicle interior lights, have been omitted for the sake of clarity.

The Figures each diagrammatically show a section through a lining 2 which covers the interior roof 1 of a vehicle and in which one or two vehicle interior lights 3, 3 and 3' respectively according to the invention are fitted.

Each of the vehicle interior lights 3, 3' includes inter alia an LED 5 and 5' respectively which serves as a light source and which is mounted on a circuit board which is arranged parallel to the interior roof 1 and which at the θsame time can also serve as a carrier for power supply means (not shown) as well as electrical and/or electronic components required for functioning of the vehicle interior light 3 and 3' respectively.

As can be seen in particular from FIG. 1 the main emission direction 8, shown by a broken line, of the light cone emitted by the LED 5 extends vertically downwardly. In many situations of use however the surface 10 which is to be illuminated with a spotlight-like effect is not disposed in that direction but is laterally displaced in relation to the main emission direction 8.

In order nonetheless to permit the circuit board 6 which carries the LED 5 to be oriented parallel to the interior roof and horizontally, which is extremely advantageous from structural and mounting points of view, the vehicle interior light 3 therefore includes a deflecting optical system which according to the invention is formed by a plurality of lens bodies 14, 15, 16 which are arranged in succession in the beam path of the LED 5 and which alter the direction thereof in the desired fashion and the action of which is substantially based on light refraction.

The illustrated embodiment has three such lens bodies 14, 15, 16 which are in the form of biconvex convergent lenses and of which the first lens body 14 which is closest to the LED 5 completely receives the light cone emitted by the LED and projects it on to the second central lens body 15. As the central axis 18 of the first lens body 14 and in particular its curved light exit surface 17 are inclined relative to the optical axis rearwardly, towards the LED, a first change in the propagation direction of that light cone already takes place here, with the angle of aperture of the light cone being reduced by the convergence properties of the first lens body 14.

The central axis 19 of the second lens body 15 is inclined with respect to the optical axis forwardly, that is to say away from the LED 5, in such a way that the light beam experiences a further deflection in the desired direction. The curvatures and inclinations of its two lens surfaces provide that the light is incident on the third lens body 16, the central axis 20 of which is inclined relative to the optical axis forwardly to an even greater degree than the central axis 19 of the second lens body 15. As a result the focused light cone of the vehicle interior light 3 now enjoys its definitive new orientation towards the surface 10 to be illuminated.

The desired lighting function, that is to say the position and size of the surface 10 be illuminated, as well as the distribution of intensity thereon, that is as uniform as possible, are achieved substantially by the configuration and orientation of the second and third lens bodies 15 and 16 as well as the cooperation thereof.

In addition the light entry surface 22 of the third lens body 16 is provided with scattering properties which are indicated by a xxx structure 23 and which on the one hand serve to cancel the prismatic effect of the optically active surfaces, that are inclined relative to each other, of the lens bodies 14, 15, 16 and thus to prevent color dispersion in the projection imaging effect; on the other hand those scattering properties achieve homogenization of the imaging effect.

To achieve the smallest possible installation size the lens bodies 14, 15, 16, as a departure from the usual lens shape, are not fully symmetrical relative to the optical axis. Rather, they are cut away to a greater or lesser extent on the side which is at the left in FIG. 1 and perpendicularly to the optical axis are precisely of such an extent that the total light beam emitted by the LED 5 can pass through them without aperture losses.

In the region of the optically non-active surfaces which are present at their cut-off sides the lens bodies 14, 15, 16 are integrally connected together by material bridges 24, 25 so that the lens system can be inexpensively produced as an injection molding and individual orientation of the lens bodies 14, 15, 16 is not required either when assembling the vehicle interior light 3 or when fitting it in the vehicle.

It will be appreciated that in accordance with the invention different inclinations of the central axes 18, 19, 29 of the lens bodies 14, 15, 16 can be provided in the production of the injection molding molds for different lens systems to achieve adaptation to widely varying situations of use.

On its side towards the LED 5 the first lens body 14 has an outwardly projecting annular bead 27 surrounding an approximately circular recess 28 into which the LED 5 projects and the bottom surface of which forms the optically active light entry surface 30 of the lens body 14. As the light cone emitted by the LED 5 has a very large apex angle only the light of its central region is incident on the light entry surface 30 of the first lens body 14, by which it is transmitted by light refraction. In order also to be able to use the light from the edge regions of the light cone of the LED, that passes into the first lens body 14 through the inside wall 32 of the annular bead 27, the outside surface 33 of the annular bead 27 is of such a configuration that the light incident thereon from the inside is so deflected by total reflection that it passes through the light exit surface 17 of the lens body 14 to be incident on the optically active light entry surface 35 of the second lens body 15 and passes through same to the third lens body 16 and finally on to the surface 10 to be illuminated.

It should be expressly noted that the use just described of totally reflecting surfaces concerns only a small proportion of the light emitted by the LED 5 and serves primarily to increase the lighting efficiency. The deflecting function as such is implemented in particular by the light-refracting properties of the lens bodies 14, 15 and 16.

As can be seen from FIG. 1 the LED 5 is so arranged that the central ray, defining the main emission direction 8, of the light beam produced thereby is displaced with respect to the apex point of the light entry surface 30 of the first lens body 14 in the Figure towards the right, that is to say in opposite relationship to the direction in which the light beam is to be deflected in order to be incident on the surface 10 be illuminated. The deflection effect is enhanced by that slight displacement.

FIG. 2 shows two vehicle interior lights 3, 3' which are arranged in mirror-image relationship with each other and each of which is of the same structure as was described with reference to FIG. 1 so that it is possible to dispense with repetition of the details.

It will be seen that here the two LEDs 5 and 5' respectively serving as the light source are mounted on one and the same carrier board 6 and that their respective light is directed by an associated deflecting optical system formed by lens bodies 14, 15, 16 and 14', 15', 16' respectively on to the two surfaces 10 and 10' to be illuminated, of which the first is associated for example with the driver of a vehicle, in particular a motor vehicle, and the second is associated with the passenger.

It will be very clearly seen from this example that the deflecting optical systems according to the invention make it possible for the two LEDs 5, 5' to be mounted on a common flat carrier board 6 although the two light cones produced extend in greatly divergent directions. Without the deflection properties of the optical systems used the two LEDs 5, 5', in a straight-line prolongation of the central axes of the light cones illuminating the two surfaces 10, 10', would have to be mounted on two separate carrier boards which would be inclined relative to each other and which would spatially impede each other.

In this case also the central rays of the two LEDs 5, 5' are displaced in opposite relationship to the respective deflection direction in relation to the apex point of the light entry surface of the respectively associated first lens body.

The invention claimed is:

1. A vehicle interior light for spot illumination of a surface to be illuminated in the interior of the vehicle having a light source emitting a light cone having a central axis the direction of which does not coincide with the direction in which the surface to be illuminated lies, and a deflecting optical system which alters both the angle of aperture and also the direction of said central axis of the said light cone,
   wherein the deflecting optical system includes three lens bodies which operate with light refraction and are arranged in succession in the beam path of the light source, each of said lens bodies having an optically active light entry surface, an optically active light exit surface and a central axis, said central axes being inclined relative to each other, wherein the three lens bodies are integrally connected by material bridges in regions of optically non-active surfaces, and wherein the light entry surface, that is towards the second lens body, of the third lens body which is furthest away from the light source is provided with scattering properties.

2. A vehicle interior light as set forth in claim 1 wherein each of the three lens bodies which are arranged in succession is in the form of a biconvex convergent lens.

3. A vehicle interior light as set forth in claim 2 wherein the first lens body arranged closest to the light source projects the light beam emitted by the light source on to the second central lens body which in turn deflects the light issuing therefrom on to the third lens body arranged furthest away from the light source and in so doing contributes to producing the desired lighting function while the third lens body finally determines the desired lighting function.

4. A vehicle interior light as set forth in claim 3 wherein on its side towards the light source the first lens body has an approximately circular recess into which the light source projects and whose bottom surface forms the optically active light entry surfaced of the first lens body.

5. A vehicle interior light as set forth in claim 4 wherein the recess of the first lens body has an annular bead which projects towards the light source and through the inside wall of which the laterally emitted light of the light source passes into the first lens body and which has an outside surface so arranged that the light incident thereon from the inside is so deflected by total reflection that it passes through the optically active light exit surface of the first lens body on to the light entry surface of the second lens body.

6. A vehicle interior light as set forth in claim 1 wherein the light source is an LED.

7. A vehicle interior light as set forth in claim 6 wherein the light entry surface of the first lens body has an apex point and wherein the LED is so arranged that the central ray, defining the main emission direction, of the light beam emitted thereby is displaced with respect to said apex point in opposite relationship to the direction in which the light beam is to be deflected to be incident on the surface to be illuminated.

* * * * *